UNITED STATES PATENT OFFICE.

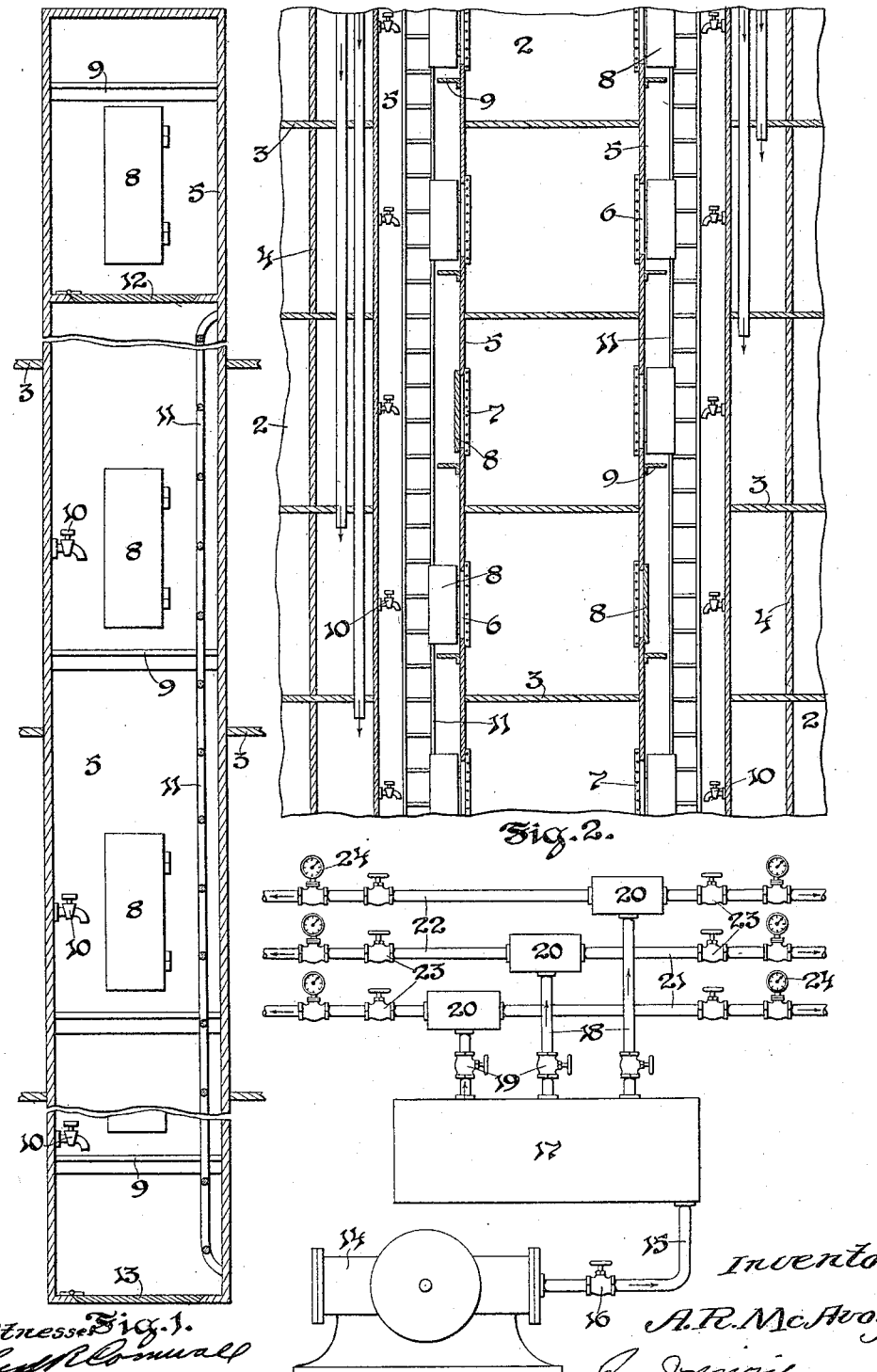

ARTHUR RICHARD McAVOY, OF COLLIE, WESTERN AUSTRALIA, AUSTRALIA.

PNEUMATIC CONTROL OF INFLOWING WATER IN DAMAGED SHIPS.

1,156,792. Specification of Letters Patent. Patented Oct. 12, 1915.

Application filed November 17, 1914. Serial No. 872,598.

*To all whom it may concern:*

Be it known that I, ARTHUR RICHARD MCAVOY, a subject of the King of Great Britain and Ireland, and a resident of the post town of Collie, in the State of Western Australia, Commonwealth of Australia, (whose post-office address is Collie, in the said State of Western Australia,) have invented certain new and useful Improvements Relating to the Pneumatic Control of Inflowing Water in Damaged Ships, of which the following is a specification.

This invention relates to ships divided by decks and bulk heads into a plurality of compartments.

Hitherto should an accident occur at sea whereby the hull of the vessel has been pierced or ruptured the compartment adjacent the hole has been flooded and the incoming water has only been controlled by the use of hand and power pumps. These have often proved insufficient. Ventilation of the compartments has also been insufficient.

The object of this invention is to prevent water rising in a vessel beyond the ruptured portion thereof the invention being used when the usual pumps have ceased to control the incoming water.

The invention is intended to be employed for controlling openings of moderate size and provides for the inspection or the testing of the compartment or compartments affected.

It also consists in the manner of applying compressed air so that the incoming water is prevented from rising and flooding compartments other than that concerned. Further, provision is made for locating the opening or rupture without risk or the necessity of descending into the ship's hold. In addition, the arrangements are such that under normal circumstances the various compartments of the vessel are thoroughly ventilated.

Referring to the drawings which form a part of this specification—Figure 1 is a sectional view of a ventilation and inspection shaft employed with this invention. Fig. 2 is a sectional view showing portion of two ventilation and inspection shafts extending through a plurality of compartments. Doors controlling communication between the shafts and the compartments are clearly seen, some of the doors being shown open and some closed for convenience of illustration. Fig. 3 is a diagrammatic view of an air compressor, compressed air reservoir and branch and delivery pipes.

The invention is applied to a vessel comprising a hull 2 divided by decks 3 and bulk heads 4 into a series of compartments. A plurality of compartments is formed between each bulk head and the next. The decks of the vessel, the bulk heads thereof and the shafts hereinafter described are all sufficiently strengthened or reinforced to withstand increased pressures as will be hereinafter understood.

To apply the invention it is necessary to provide doors, covers or the like of any desired nature whereby all hatches, stairways, passages and the like may be closed in order that each deck 3 of the vessel may be completely sealed. Double doors *i. e.* an inner door and an outer door, may be provided on stairways and wherever necessary to this end. The hatches may be level with the decks and provision be also made for closing all ventilators. The engine room may be provided with double walls and have double doors or the like whereby it may be suitably sealed as also may be the stoke holds. The sealing of the decks, engine room, stoke holds, ventilators and the like may be accomplished in any well known way without involving invention and forms no part of the present invention. Further, the stoke holds, engine room, and like places to which this invention cannot be applied, may be provided with a suitable pump or pumps of any suitable nature.

The invention includes a ventilation and inspection shaft 5. Two or more shafts are provided between each bulk head 4 and the next and extend through the whole series of compartments disposed between the said bulk heads. Any number of shafts may be employed. Formed in each shaft adjacent each deck 3, is a doorway indicated at 6. Each shaft thereby communicates with each compartment through which it passes. Controlling each doorway is a suitable screen 7 and a safety door 8. The doors 8 of each shaft preferably open thereinto. The screens 7 may be of a sliding nature and be disposed outside the shaft. They may comprise frames covered with a suitable wire netting or the like. Within each shaft 5, adjacent each doorway 6, may be a suitable platform or the like 9. This may project from one side only of the shaft. Or it may project from more than one side thereof. Or it may project from all of the sides of the said shaft. Adjacent each doorway 6 of each of the shafts and communicating with each of the compartments through which the shaft passes is a test tap 10 or the like. Passing through and disposed within each shaft 5 is also a ladder 11. Disposed within each shaft 5 at the upper end thereof is a shaft closing door 12. Each shaft is, therefore, provided with both a door 8 and a door 12 at its upper end. The platform 9 adjoining the upper doorway 6 of each shaft is disposed above the door 12 of the said shaft. Disposed within each shaft 5 at the lower end thereof is a lower shaft closing door 13. All of the doors of each shaft may be operable simultaneously by any suitable means. Or they may be operated separately. Or they may be operable both individually and simultaneously. Further, the doors in both of the shafts between any two bulk heads may be operated simultaneously if desired. Pneumatic or hydraulic means may be employed for operating the shaft doors. Two or more ventilation shafts may also be provided for the stoke hold or furnaces, said shafts having safety doors as described, where required.

With the foregoing is used an air compressor 14 of any suitable character. Communicating with the compressor is an air main 15 having thereon a control valve 16. The main communicates with a compressed air reservoir 17. Passing from the reservoir is a series of branch pipes 18 each having thereon a control valve 19 communicating with a subsidiary reservoir 20. Passing from each subsidiary reservoir 20 is a forward delivery pipe 21 and an after delivery pipe 22. A delivery pipe is provided for each compartment in the vessel. Upon each of the pipes 21 and 22 is a control valve 23 and a pressure gage 24. Any number of compressors may be provided and any other means may be employed whereby compressed air may be delivered to any compartment in the vessel.

With this invention under normal circumstances the doors 8 of each ventilation and inspection shaft 5 are open. The screens 7 cover the doorways 6 preventing rubbish or the like being thrown down the shafts without interrupting ventilation. The screens are particularly useful when a vessel is loading or unloading. By providing two or more shafts between each bulk head 4 and the next bulk head thorough ventilation of all the compartments between the said bulk heads is effected, the upper and lower doors 12 and 13 being normally open. The doors 12 and 13 have been shown closed in Fig. 1 for convenience of illustration only. If desired, the shafts may be provided with any suitable means or devices whereby air may be pumped or forced to or from any compartment of the vessel. The shafts 5 may also be disposed so as to provide ventilation for the stoke-hold. The upper end of each shaft extends above the upper deck. Its lower end may terminate above or below the foot plates of the stoke-hold or be otherwise arranged, the precise termination depending upon circumstances. Should the vessel become damaged the compartment affected is immediately located by use of the shafts 5. It is only necessary to operate each test tap 10 in succession to ascertain which compartment has been flooded with water. Upon accident occurring all of the doors 8 except that one above the upper deck are immediately closed as also is the door 13. Air or water will immediately pass from the tap 10 of an affected compartment. The decks of the compartment concerned are sealed in any suitable manner such as by doors covers and the like. The compartment is then airtight. The control valves 19 of the branch pipes 18 are then operated, the air compressor 14 delivering air into the compartment concerned. Any number of compressors may be used. Should more than one compartment be damaged they are all treated similarly. By the control valves, however, the volume and pressure of air may be varied in different compartments. This need not be effected by the arrangements shown but by any other arrangements or devices. The compressed air delivered into a compartment prevents the water therein from rising, the said water being forced back until the hole, opening or rupture is reached. The gages 24 may be read to ascertain in which pipe or pipes the pressure is falling and therefore the locality of the opening, hole or rupture. Under normal circumstances the air compressor 14 may, if desired, be employed to ventilate the several compartments of any vessel the doors 8 of the shafts 5 being normally open, as aforesaid, to assist in natural ventilation. The compressor may also deliver air in front of the furnaces if desired, for ventilating and cooling purposes. It should also be mentioned that telephonic communication may be provided between the several shafts and between the shafts and the engine room and other parts of the ship so that upon a person ascertaining in which compartment water is entering he may telephone to persons in other shafts or parts of the vessel to that effect, and in the event of the doors of the various shafts being mechanically controlled the person or persons within the shafts 5 may telephone their requirements. The shafts may also be fitted with suitable illuminating agents, such as electric light.

Having now described my invention what

I claim as new and desire to secure by Letters Patent is:—

1. In an apparatus of the character described the combination with air compressing means and air distributing means comprising a main reservoir and subsidiary reservoirs connected thereto, a delivery pipe from each subsidiary reservoir to the member to be supplied, of a plurality of air-tight compartments having inspection shafts interposed between them, the aforementioned air delivery pipes each entering a compartment, and means for varying the pressure of the air admitted to a compartment or compartments.

2. In an apparatus of the character described, the combination with air compressing and distributing means, of a plurality of air tight compartments, means for detecting the damaged compartment and subsidiary reservoirs separate from the compressing means connected to each compartment, and means for supplying compressed air to the damaged compartment from the reservoir connected thereto.

In testimony whereof I affix my signature in presence of two witnesses.

ARTHUR RICHARD McAVOY.

Witnesses:
CECIL McCLASTRUE,
FRANK H. CAIN.

Copies of this patent may be obtained for five cents each, by addressing the "Commissioner of Patents, Washington, D. C."